Aug. 9, 1966          J. A. RHINE          3,264,744
                      GEAR CHECKER
Filed Sept. 27, 1962                    4 Sheets-Sheet 1

INVENTOR.
JULES A. RHINE
BY
Schramm, Kramer & Sturges
ATTORNEYS.

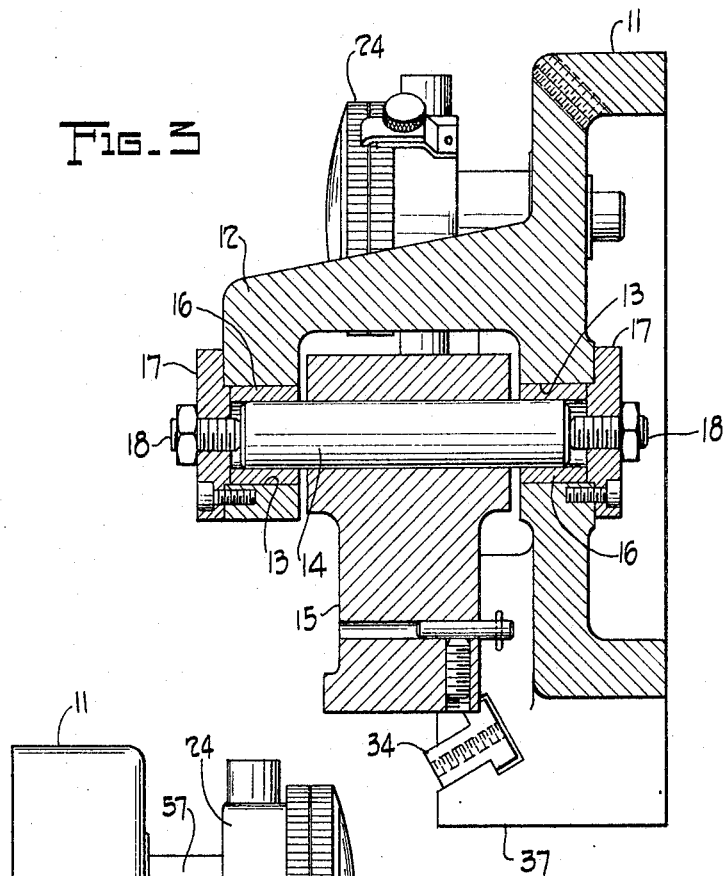
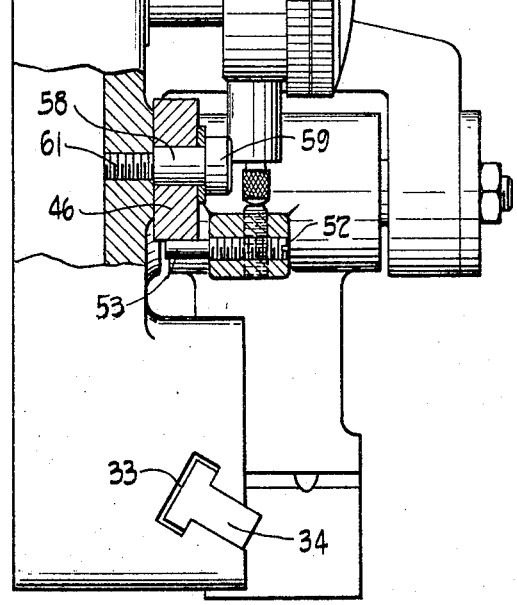

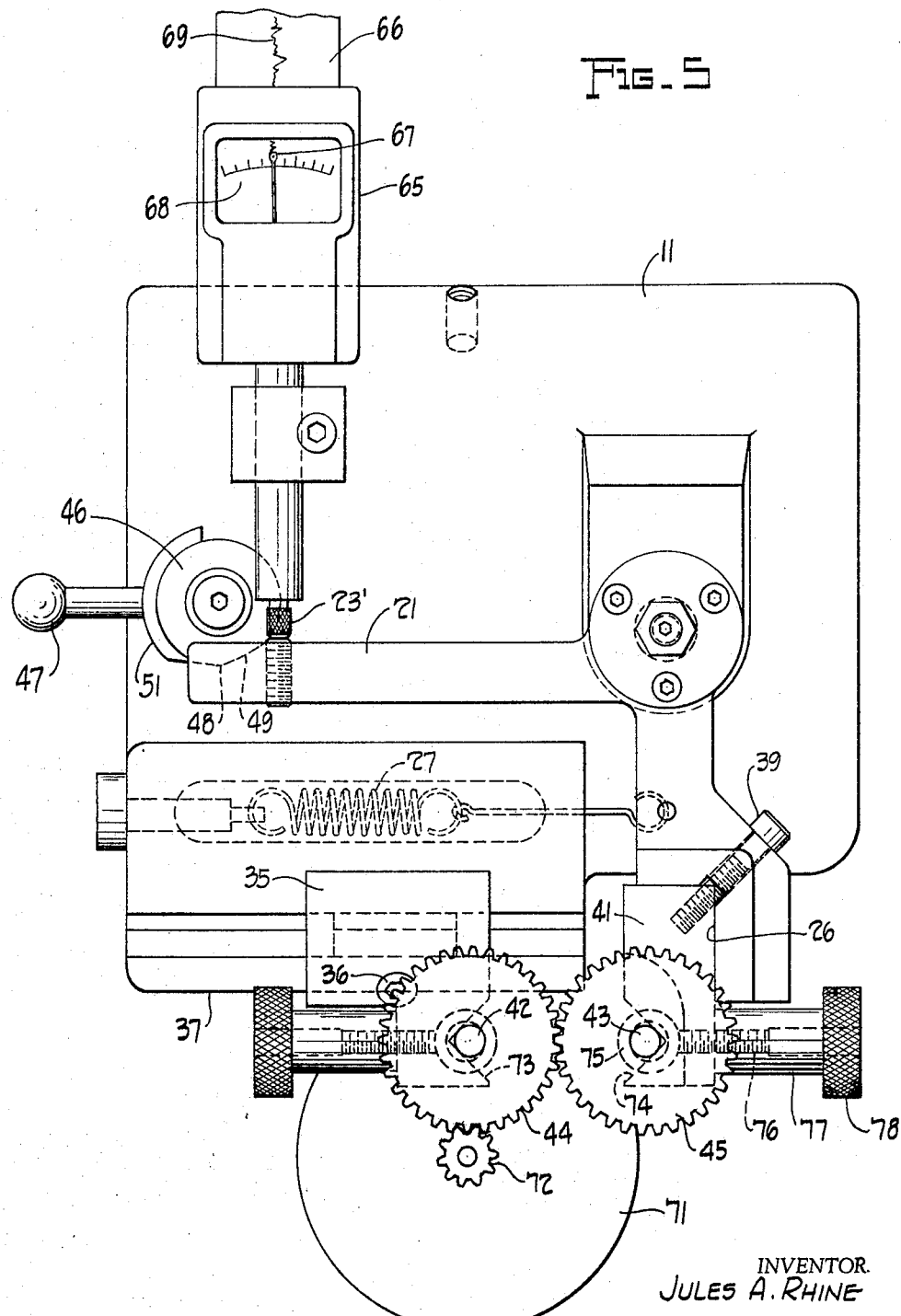

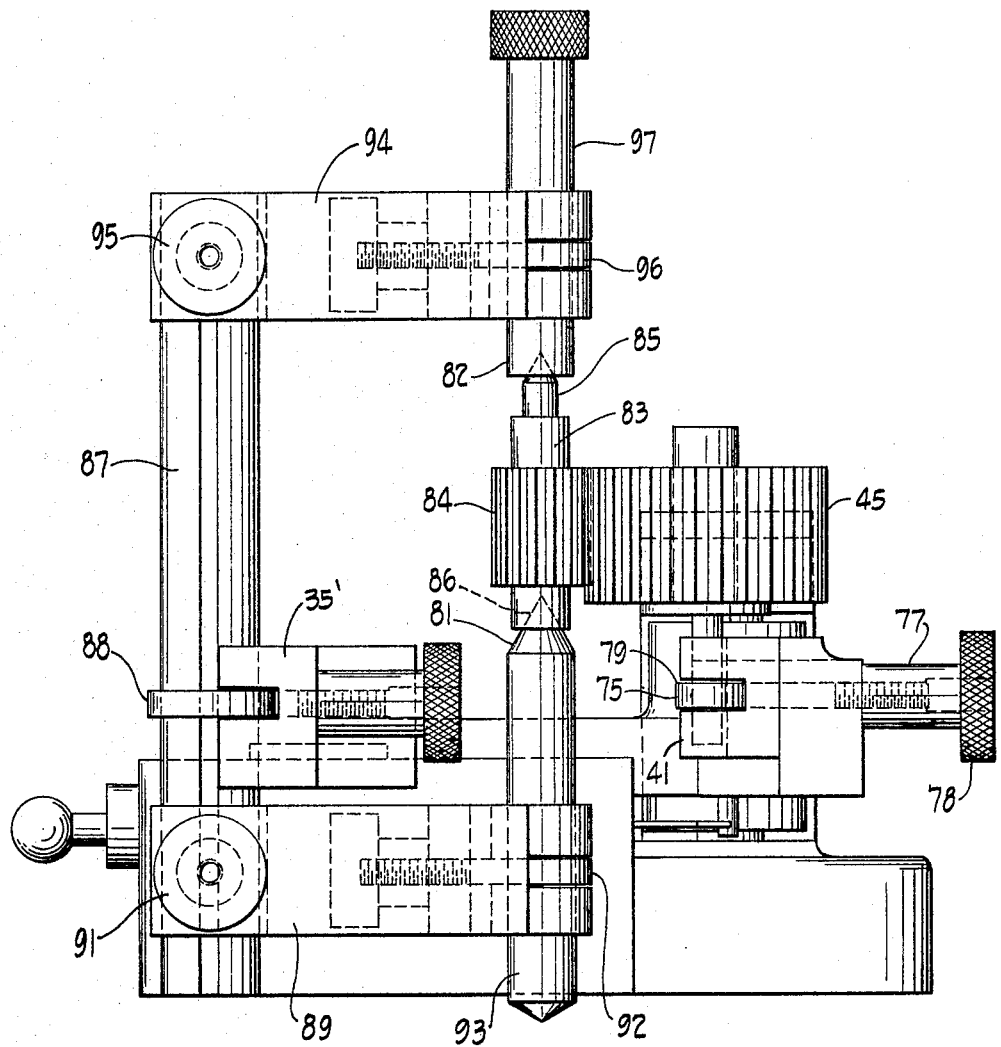

United States Patent Office 3,264,744
Patented August 9, 1966

3,264,744
GEAR CHECKER
Jules A. Rhine, 1736 E. 30th St., Cleveland, Ohio
Filed Sept. 27, 1962, Ser. No. 226,708
3 Claims. (Cl. 33—179.5)

This invention relates to checking apparatus and concerns particularly sensitive apparatus for checking circular and rotatable objects such as gears.

A primary object of the invention is to provide a gear checker which is relatively light, durable, sturdy and inexpensive, and which may readily be mounted on a lathe or gear cutting machine so as to enable the operator to check gears, or other objects which have been cut, immediately at his machine, thus avoiding the loss of time involved in carrying the work to a testing laboratory or measuring station.

A further object of the invention is to provide a checking device in which the movable parts run freely and which is not subject to sluggishness, sticking or other difficulties from accumulated grease, sticky material or other problems.

A further object of the invention is to provide a checker which gives readings very quickly and provides indication of acceptability of the work without the necessity for making or noting precise measurements.

Still another object of the invention is to provide checking apparatus which gives a continuous record of checks made.

Other and further objects, features and advantages of the invention will become apparent as the description proceeds.

In carrying out the invention in a preferred form in connection with a gear checker, a supporting plate is provided upon which a bell crank lever is pivotally mounted with a vertical pivot axis. The lever has a first arm with an end adapted to receive a jig and a second arm with a portion adapted to actuate a needle gauge. The supporting plate also has a portion adapted to receive a jig and the jigs are so made as to be interchangeable, receiving gear shafts of different sizes to enable different sizes of gears to be checked. One shaft is adapted to support a master gear rotatably whereas the other is adapted to support rotatably a gear which is to be checked in mesh with the master gear.

A tension spring is provided which is connected at one end to the supporting plate and at the other end to the first lever arm for biasing the gear supporting shafts towards each other with fixed pressure. The spring pressure is so adjusted as to apply to the gears the measuring pressure required for checking fine pitch gears in accordance with the specification of the American Gear Manufacturers Association. A standard dial gauge is mounted upon the supporting plate, having an actuating pin or needle bearing against the gauging portion of the second lever arm and having a pair of spaced limit indices on a dial which may be set to the maximum permissible limits of variation in runout and ptch diameter of the gear which is being tested.

A rotatable cam is also mounted upon the supporting plate adjacent to the second lever arm on the side thereof toward which the tension spring tends to deflect the second lever arm; and the cam has three arcuate portions of different radii. One arcuate cam portion has such a radius as to separate the gear supporting shafts sufficiently to unmesh the gears in order to enable the tested gear to be removed and another gear to be inserted in place thereof. There is a second cam portion having such a radius that the second lever arm engages the gauge pin in zero position thereof. The third cam portion has a smaller radius so as to be disengaged from the second lever arm when gears are in position on the gear supporting shafts so as to permit one gear to bear against the other regardless of irregularities when the dial reads variations in pitch runout and pitch diameter of the gear being tested.

A better understanding of the invention will be afforded by the following detailed description considered in conjunction with the accompanying drawing in which FIG. 1 is a plan view of an embodiment of the invention with the gear shaft supporting jigs removed.

FIG. 3 is a view of a cross section of the apparatus of FIG. 1 represented as cut by a vertical plane 3—3 indicated in FIG. 1.

FIG. 4 is a view of a broken section represented as cut by a broken plane 4—4 indicated in FIG. 1.

FIG. 5 is a plan view of the apparatus of FIG. 1 showing gear supporting jigs in place with a gear to be tested and a master gear mounted thereon and with a curve drawing gauge or deflection recorder mounted in the apparatus in place of the extensometer type of gauge shown in FIG. 1.

FIG. 6 is an elevation of the apparatus of FIG. 1 illustrating the use of a different jig for supporting center points for use in checking pinions or gears which are mounted upon spindles.

Like reference characters are utilized throughout the drawing to designate like parts.

Figure 1:
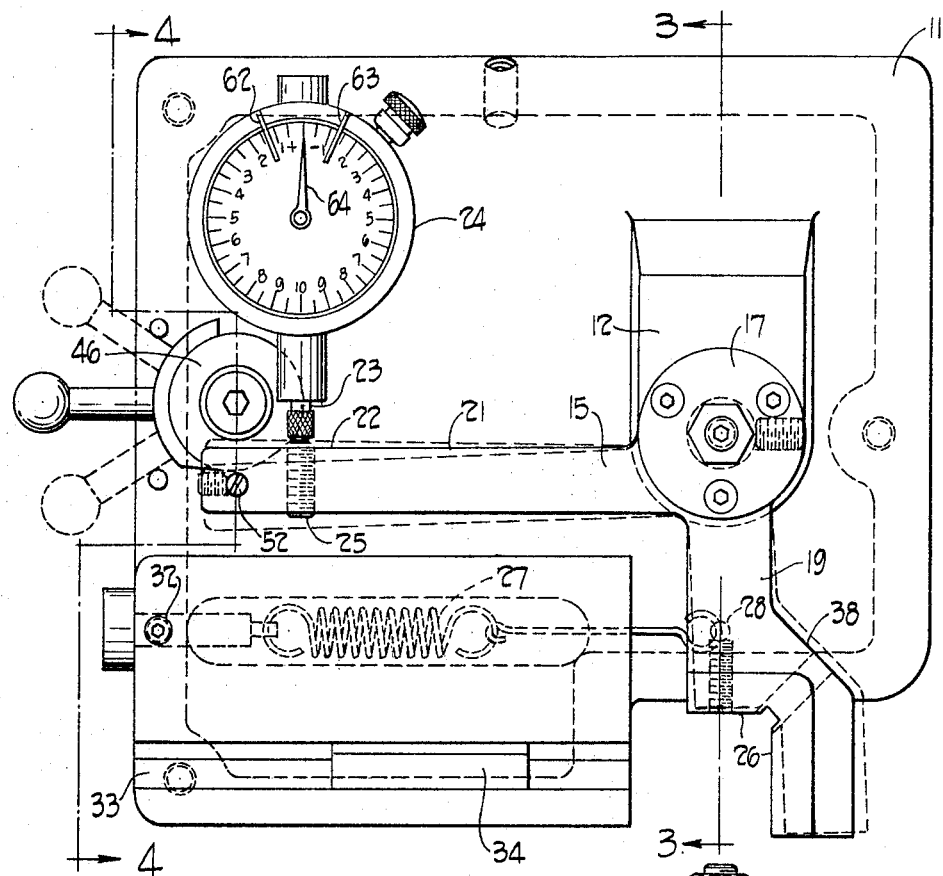
Figure 2:
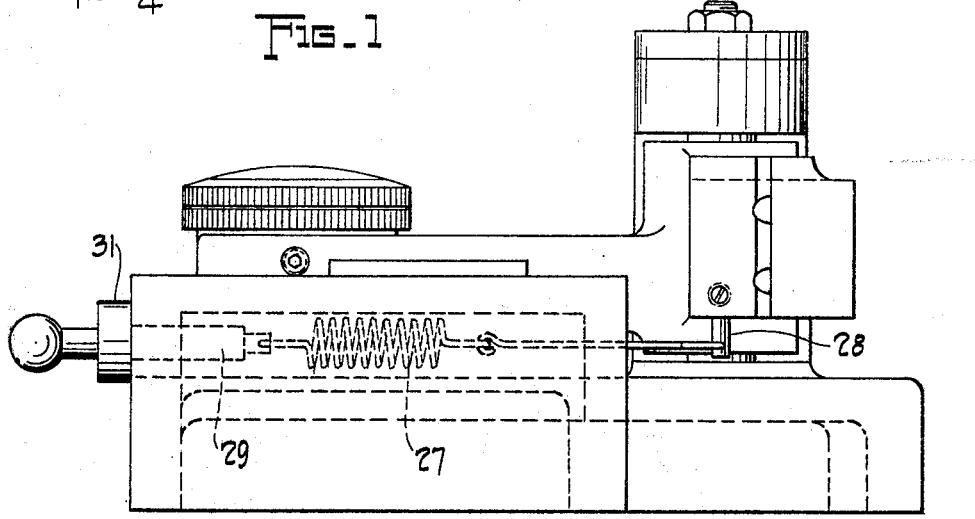
FIG. 2 is an elevation of the apparatus of FIG. 1.

In the checking apparatus illustrated in FIGS. 1 and 2 there is a supporting plate or platform 11 which may be in the form of a casting having a post portion 12 (better shown in FIG. 3) with openings 13 to receive a vertical pivot shaft or spindle 14 for a bell crank lever 15. Suitable means are provided for supporting the pivot spindle 14 perpendicularly on the supporting plate 11. For example bushings 16 may be mounted in the openings 13 in the post portion 12 of the supporting plate 11 and caps 17 may be secured to the upper and lower ends of the post portions 12 with axial positioning screws 18 threaded into the caps 17.

As shown in FIG. 1 the bell crank lever 15 has a forwardly extending arm 19 and a sidewardly extending arm 21. The sidewardly extending arm 21 has a portion 22 adapted to engage the projecting pin 23 of a dial gauge 24. The dial gauge 24 may be of a conventional type, not constituting a part of my invention, such as employed in extensometers, for example, or other applications where minute deformation or movement is to be measured. Preferably, in order to make the engagement of the arm 21 with the gauge 24 adjustable, an adjustable screw 25 is threaded into the portion 22 of the arm 21 for engaging the end of the dial pin 23.

The forwardly extending arm 19 of the bell crank lever 15 is formed with a right-angle, V-notch or channel 26 which is adapted to receive suitable interchangeable jigs for supporting masters or parts to be gauged, different jigs being used according to the size and type of the piece to be supported. Means are provided for resiliently biasing the arm 19 toward the left, which takes the form in the embodiment illustrated of a tension spring 27. As shown in FIG. 2 the tension spring 27 is connected between a pin 28 extending downwardly from the lever arm 19 and an adjustable end support 29. The end support 29 is provided with a head 31 for making adjustments manually and may be threaded or provided with a set screw 32 to fix it in a position which produces a selected pressure acting at the jig portion 26 of the forwardly extending arm 19. In this manner the pressure acting may be adjusted to conform to the standard specifications of the American Gear Manufacturers Association for the pressure to be applied between engaging gears in making tests thereon.

A T-slot 33 is formed in the supporting plate 11 which is adapted to receive a T-cross section block 34 (shown in FIG. 4) to which a jig block 35 (shown in FIG. 5) may be secured by means of a screw 36 and thereby fixed longitudinally with respect to the slot 33 and the supporting plate 11. As shown in FIG. 5 the jig block 35 overhangs the front edge 37 of the supporting plate 11 so that it is accurately positioned with respect to the front edge of the supporting plate 11, the front edge 37 being machined and the block 35 also being machined.

The forwardly extending arm 19 is provided with a threaded hole 38 extending into the apex of the V-notch 26, for receiving a headed machine screw 39 adapted to secure a jig block 41 in the V-notch 26 as shown in FIG. 5. As will be described more in detail hereinafter the jig blocks 35 and 41 are formed so that vertical, gear supporting shafts 42 and 43 may be removably secured thereto. The shafts 42 and 43 are adapted to receive rotatably gears 44 and 45, one of which is a master gear and the other of which is the gear to be checked.

In order to separate the shafts 42 and 43 and thereby to separate the gears 44 and 45 when the gears are to be replaced with other gears or when the checked gears to be removed and replaced by the next gear to be checked and adjustments may be made upon the setting of the dial gauge 24, a rotatable cam 46 is provided having a manipulating handle 47. As indicated in FIG. 1 the cam 46 is a three position cam having three arcuately extending portions of different radii. There is a relatively short arcuate portion 48 of uniform radius along its length for fixing the zero dial position of the lever arm 21, a reduced radius portion 49 for "metal to metal" contact of the gears 44 and 45 and a substantially increased radius portion 51 for separating the gears 44 and 45. Preferably as shown in FIGS. 1 and 4 a downwardly extending pin 52 is threaded into the lever arm 21 having a downwardly projecting smooth portion 53 serving as a cam follower for the cam 46.

It will be understood that the dial gauge 24 is secured to the supporting plate 11 in a suitable manner as by means of a post 57 extending upwardly from the supporting plate 11 and secured to the gauge 24 by a suitable mean such as screws (not shown). As best shown in FIG. 4 the cam 46 is rotatably secured to the supporting plate 11 by means of a pin 58 having a head 59 and having a reduced diameter portion 61 threaded into the supporting plate 11. Preferably the dial gauge 24 is provided with angularly adjustable limit indices 62 and 63 for cooperation with the needle or pointer 64 of the gauge 24 for locating on the dial of the gauge 24 the lower and upper permissible limits of gear pitch diameters.

In employing the apparatus of FIGS. 1 and 2 with the gear supporting jigs 35 and 41 of FIG. 5 to check pitch diameter and runout of a gear 45 to be tested against a master gear 44, the handle 47 of the cam 46 is first set to the center position shown in full lines in FIG. 1 and FIG. 5 before the gears 44 and 45 have been mounted in place. It is assumed that the position of the jig block 35 along the T-slot 33 has already been fixed to correspond to the diameter of the gears to be checked so that the gauge 24 will read zero for a gear of precisely correct pitch diameter. The zero reading portion 48 of the cam 46 holds the lever arm 21 in this position against the biasing force of the spring 27. If necessary the dial gauge 24 is adjusted to obtain a zero reading in this position of the lever arm 21.

Thereupon the cam 46 is rotated to the position in which the increased radius portion 51 engages the cam follower 53. Consequently the gear supporting shafts 42 and 43 are separated so that a gear to be tested may be inserted in place. Thereupon the cam 46 is turned to the opposite extreme position with the cam portion 49 opposite the cam follower 53. In this case however no contact is made between the cam portion 49 and the cam follower 53 since the teeth of the gears 44 and 45 are in mesh and the spring 27 serves to hold the gears together.

One of the gears is then rotated and the dial pointer 64 is observed. Fluctuation of the pointer 64 indicates that there is a variation in ruout of the tested gear during the roll test thus being made. Since the cam follower 53 does not contact the portion 49 of the cam 46 the arm 21 is free to deflect back and forth and likewise the needle 64 is free to deflect in either direction to indicate deviations in pitch diameter of the tested gear. If the dial pointer 64 does not deflect beyond either of the limit indices 62 and 63, the operator is apprised that the gear being tested has met specifications and he then moves the cam handle 47 to the position with the increased radius portion 51 bearing against the cam follower 53 so that the gears 44 and 45 are separated. This enables the operator to remove the gear which he has just tested without interfering with the delicacy of the dial gauge and to replace the tested gear with the next gear to be tested. Thereupon, assuming that the zero setting has already been made, the cam handle 47 is moved to the opposite extreme position with the cam follower 53 unloaded by the reduced diameter portion 49 of the cam 46 so that the metal to metal contact again takes place between the gears and the succeeding test may be made.

If it is desired to provide a continuous record of the gear roll tests a recording gauge 65 as shown in FIG. 5 is mounted on the supporting plate 11 in place of the deflecting pointer dial gauge 24. The recording or curve-drawing gauge 65 has a gauge pin 23' acting in relation to the bell crank arm 21 in the same manner as already described for the pin 23 of FIG. 1. However in place of the dial a moving strip chart 66 is provided and in place of the deflecting pointer 64 a deflecting pen or stylus 67 is provided. It will be understood that as in conventional curve-drawing measuring instruments a calibration scale 68 may be provided. The curve-drawing gauge 65 itself does not constitute a part of the present invention and therefore need not be described in detail. It will be understood that such gauges are provided with chart carriages for producing the requisite movement of the chart 66 so that the pen 67 contacting the chart 66 draws a curve 69 upon the chart as the gears 44 and 45 are being rotated and the chart strips 66 issues from the gauge 65.

It will be understood that such chart carriages are provided with suitable spring wound or synchronous electric motors for producing the chart movement. Preferably, for the sake of synchronizing the motion of the gears 44 and 45 and the strip chart 66, a synchronous chart driving motor is employed of a type well known to those skilled in the art in connection with curve-drawing chart instruments. In this case a synchronous motor 71 is also provided and so mounted in relation to the platform 11 that its pinion 72 engages or meshes with one of the gears 44 or 45. Consequently, the gears rotate at a speed proportional to the rate of movement of the chart 66. It will be understood that the synchronous motor 71 and the synchronous motor driving the chart 66 mounted within the curve-drawing gauge 65 are connected to the same alternating-current central station power system so that the two motors run synchronously.

The checker illustrated is adaptable for making tests on different types and sizes of gears as well as other parts or work to be checked and the apparatus is made adaptable for different kinds of work by the provision of interchangeable jig blocks corresponding to the jig blocks 35 and 41. When vertical shafts such as the shafts 42 and 43 are to be supported, the jig block 35 is formed as shown with a right angle V channel 73, against which the vertical shaft 42 may be clamped. Likewise the jig block 41 is formed with a V channel 74 against which the vertical shaft 43 may be clamped. Since the channels 73 and 74 are V channels, shafts of different sizes may be clamped in the V blocks without necessitating the use of the different jig block for each different size of shaft.

The shaft clamping arrangements for the jig blocks 35 and 41 are alike so that it will be sufficient to describe the clamping arrangement for the jig block 41 which is shown in both FIGS. 5 and 6. There is a clamping jaw 75 in a form of an eye, which may be substantially circular, formed on the end of the threaded stem or screw 76 which extends through a suitable opening 79 in the block 41 and is drawn toward the apex of the V channel 74 by suitable means such as an internally threaded cylindrical bar 77 having a knurled head 78 to form a clamping nut. As better shown in FIG. 6 the opening in the block 41 is milled out to form a channel conforming to the shape of the cross section of the clamping eye or jaw 75; so that but for the presence of the shaft 43, the rotation of the knurled head 78 would draw the clamping jaw 75 beyond the surfaces of the V channel 74. In this manner even the smallest sizes of shafts corresponding to the 43 may be clamped against the surfaces of the V channel 74.

It will be understood that the invention is not limited to checking gears. For example, if some part other than a gear is to be checked, such as a notched circular piece for example, one of the gears such as the gear 44 may be replaced by such a part and the gear 45 with its supporting shaft 43 may be replaced by a fixed contacting piece or nose adapted to contact successive portions of the periphery of a rotatable part mounted in a position of the gear 44. Then the dial gauge 24 or the curve drawing gauge 65 will serve to provide indications of the dimensions of successive peripheral parts of the object being tested.

The checker illustrated is adapted also, by the replacement of the jig blocks 35 and 41 by other suitable jig blocks, for the checking of numerous other types of parts. For example, if it is desired to check gears or pinions which are mounted in spindles instead of having shaft receiving openings the arrangement of FIG. 6 may be employed. In this case the gear 45 is made the master gear and mounted in the same manner as illustrated in FIG. 5 and the jig block 35 is replaced by a suitable jig having spaced centers 81 and 82 to receive a spindle 83 upon which the gear or pinion 84 to be tested is mounted.

It is assumed in this case that the spindle 83 has a conical end pin 85 at one end and the spindle 83 has a centered conical opening 86 at the other end. However if spindle 83 is formed with conical socket at both ends or with a projecting conical point at both ends suitable changes would made in the centering elements 81 and 82.

In the arrangement of FIG. 6 the jig block 35 is replaced as shown by a larger jig block 35' having a clamping jaw 88 similar to that already described for supporting a vertical post 87, which may be square in cross section. Secured to the lower end of the vertical post 87 there is an adjustable arm 89 which carries a clamping jaw at one end similar to those already described having a knurled head 91 whereby the arm 89 is secured to the lower end of the vertical post 87.

At the opposite end of the arm 89 is another clamping jaw 92 similar to those already described serving to support a vertical shaft 93 which is formed with the center 81 at the upper end. There is a second arm 94 secured to the upper end of the vertical post 87 by means of clamping jaws including a knurled adjusting head 95 and the ring shaped clamping jaw 96 corresponding to the elements 91 and 92 of the arm 89. The clamping jaw 96 secures the vertical shaft or pin 97, the lower end of which is formed with the conical socket 82 to receive the pointed end 85 of the spindle 83.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

I claim:
1. A gear checker comprising in combination with a supporting plate
   a bell crank lever pivotally mounted on the plate with a vertical pivot axis,
   the lever having a first arm with an end adapted to receive a first jig,
   the lever having a second arm with a portion adapted to engage a gauge,
   the supporting plate having a portion adapted to receive a second jig,
   a pair of jigs secured to the first lever arm and the supporting plate respectively and each supporting a vertical shaft,
   one shaft adapted to support a master gear rotatably,
   the other shaft being adapted to support rotatably a gear to be checked in mesh with the master gear,
   a tension spring connected at one end to the supporting plate and at the other end to the first lever arm for biasing the gear supporting shafts towards each other with fixed pressure,
   a dial gauge secured to the supporting plate having an actuating pin bearing against the gauge engaging portion of the second lever arm and dial with a pair of spaced limit indices thereon,
   and a cam mounted upon the supporting plate adjacent to the second lever arm on the side thereof toward which said tension spring tends to deflect the second lever arm,
   the cam having three arcuate portions of different radii,
   one arcuate cam portion having such a radius as to separate the gear supporting shafts sufficiently to unmesh the gears,
   a second cam portion having such a radius that the second lever arm engages the gauge actuating pin in zero position thereof,
   a third cam portion having a smaller radius to permit one gear to bear against the other regardless of irregularities when the dial reads variations in pitch runout and pitch diameter of the gear being tested and acceptable gears are indicated by retention of the dial reading excursions within said dial limit indices.

2. A gear checker comprising in combination with a supporting plate
   a bell crank lever pivotally mounted on the plate with a vertical pivot axis,
   the lever having first and second arms,
   a vertical shaft supported at the end of the first arm,
   a second vertical shaft supported on the supporting plate in relative proximity to the first vertical shaft,
   the first shaft being adapted to support a master gear rotatably, the second shaft being adapted to support rotatably a gear to be checked in mesh with the master gear,
   a spring connected between the supporting plate and the bell crank lever biasing the gear supporting shafts toward each other,
   a dial gauge having an actuating pin engaging the second lever arm,
   and a cam mounted upon the supporting plate adjacent the second lever arm on the side thereof toward which said spring tends to deflect the second lever arm,
   the cam having three arcuate portions at different radii,
   one arcuate cam portion having such a radius as to separate the gear supporting shafts sufficiently to unmesh the gears, a second cam portion having such a radius that the second lever arm engages the gauge actuating needle in zero position thereof, a third cam portion having a smaller radius to permit one gear to bear against the other regardless of irregularities when the dial reads variations in pitch runout and pitch diameter of the gear being tested.

3. A checker comprising in combination with a supporting plate a member movably mounted upon the plate having an engaging portion and a holding portion comprising a first holding device, a second holding device mounted upon the supporting plate also having a holding portion, one of said holding devices being adapted to support rotatably a device to be tested and the other holding device adapted to support a test object contacting element, a deflection indicating device engaging said movable member whereby the deflection indicating device responds to variations of the position of the movable member in which the object contacting device engages the tested object for different angular positions thereof, each holding device holding portion constituting a universal clamp adapted for objects of different diameters comprising in combination, a member with a V-channel therein, a shaft for rotatably carrying the device to be tested and supported rotatably, a movable jaw member adapted to surround the shaft, means for drawing the jaw member against the apex of the V-channel for clamping the shaft in said channel, means for resiliently biasing toward each other the holding device for supporting the test device and the holding device for supporting a test object contacting element, a cam having three different portions of different dimensions adapted to engage the movable member in different cam positions, the first cam portion having such dimensions as to separate the object contacting element from the tested device, the second portion of the cam having such dimensions as to position the movable member in the zero position of the deflection indicator, and a third portion of the cam having such dimensions as to release the movable member and permit it to deflect without regard to irregularities in the object being tested.

References Cited by the Examiner
UNITED STATES PATENTS

| | | | |
|---|---|---|---|
| 1,436,848 | 11/1922 | Allie | 33—152 |
| 1,445,631 | 2/1923 | Lotz | 33—179.52 |
| 2,195,820 | 4/1940 | Matchett | 33—179.5 |
| 2,447,445 | 8/1948 | Widen | 33—179.52 |
| 2,540,961 | 2/1951 | Osplack | 33—179.52 |
| 2,661,542 | 12/1953 | Bean | 33—179.52 |
| 2,726,456 | 12/1955 | Pergande | 33—179.52 |
| 2,807,884 | 10/1957 | Tutle | 33—174 |
| 2,810,965 | 10/1957 | Beam | 33—179.52 |
| 2,815,579 | 12/1957 | Bassoff | 33—179.52 |
| 3,086,293 | 4/1963 | Wharton | 33—174 |
| 3,133,356 | 5/1964 | Mercier | 33—179.52 |

LEONARD FORMAN, *Primary Examiner.*

ISAAC LISANN, ROBERT EVANS, *Examiners.*